United States Patent [19]

Homola et al.

[11] 4,280,918

[45] Jul. 28, 1981

[54] MAGNETIC PARTICLE DISPERSIONS

[75] Inventors: Andrew M. Homola; Sondra L. Rice, both of San Jose, Calif.

[73] Assignee: International Business Machines Corporation, Armonk, N.Y.

[21] Appl. No.: 128,763

[22] Filed: Mar. 10, 1980

[51] Int. Cl.³ .............................................. B01J 13/00

[52] U.S. Cl. .............................. 252/62.51; 252/62.53; 252/313 S

[58] Field of Search ............ 252/62.51, 62.52, 313 R, 252/313 S, 62.53

[56] References Cited

U.S. PATENT DOCUMENTS

| | | | |
|---|---|---|---|
| 2,085,129 | 6/1937 | Stoewener | 252/317 |
| 2,731,326 | 1/1956 | Alexander et al. | 252/313 S X |
| 2,733,160 | 1/1956 | Iler | 428/331 |
| 2,885,366 | 5/1959 | Iler | 252/313 S |
| 3,042,616 | 7/1962 | Brown | 252/62.53 |

FOREIGN PATENT DOCUMENTS

| | | | |
|---|---|---|---|
| 1294982 | 4/1962 | France | 252/313 R |

*Primary Examiner*—F. C. Edmundson
*Attorney, Agent, or Firm*—Walter J. Madden, Jr.

[57] ABSTRACT

A magnetic dispersion is prepared by adjusting the pH of a mixture containing magnetic particles to a value which results in a positive electrostatic charge on the particles, while a mixture containing colloidal silica particles at the same pH results in negative electrostatic charges on the silica particles. Combining these mixtures causes the silica particles to coat and irreversibly bond to the magnetic particles resulting in better dispersion and less aggregation of the magnetic particles.

7 Claims, 2 Drawing Figures

MAGNETIC PARTICLE DISPERSIONS

TECHNICAL FIELD

This invention relates to methods for producing magnetic dispersions for use in magnetic coatings, the dispersion having magnetic particles therein which are of small size and of uniform distribution throughout the coating.

BACKGROUND ART

In the preparation of magnetic recording materials, such as for magnetic disks, it has been common to use magnetic particles, like $Fe_2O_3$, dispersed in a binder mixture to form the magnetic recording material. A dispersion is usually formed by milling the ingredients together for an extended period of time in an effort to thoroughly coat the magnetic particles with the binder ingredients and to break up collections or aggregations of such particles. Magnetic particles of this type tend to cling together and it is desirable to reduce or eliminate this aggregation of particles in order to produce smaller effective magnetic particle sizes for higher density magnetic recording. The degree of uniform dispersion of the magnetic particles in the binder is an important factor in determining the final quality of the magnetic coating, as measured by the parameters of surface smoothness, orientation ratio, signal-to-noise ratio, linearity, modulation noise, coercive force and wear properties.

The milling operation described above is not always totally effective in separating the magnetic particles and causing them to remain separated until the magnetic coating material has been applied to a substrate, with the result that some aggregation of the magnetic particles does occur in the finished magnetic coating.

Surfactant materials have been applied to the magnetic particles in an effort to keep them apart, but because of the magnetic attraction between these particles, the use of surfactants alone has not been satisfactory in preventing deterioration of the dispersion with time.

It has been proposed in the prior art to provide a coating of amorphous material, such as amorphous silica, on articles of different shapes. One example of this is shown in U.S. Pat. No. 2,885,366, Iler, in which the articles to be coated are placed in a water-based dispersion having a pH of approximately 9 or higher, and silica is added thereto to coat the articles with a layer of amorphous silica. This patent does not teach the use of silica particles uniformly distributed over the surface of the coated article, nor the control of the size of the silica particles controlled in relation to the size of the particles to be coated.

THE INVENTION

In accordance with the present invention, magnetic particles are provided with a uniform coating of material, preferably colloidal silica, the coating preventing aggregation of the magnetic particles in the magnetic coating mixture and resulting in higher attainable magnetic recording densities in the magnetic coating.

The dry magnetic particles are first mixed with a substance, such as a suitable acid, to dissolve bridges between particles and to help break up aggregates of particles. The pH of the solution containing the magnetic particles is then adjusted to a value which will result in a positive electrostatic charge on the particles. To this mixture is then added a slurry containing colloidal particles, preferably silica, the colloidal particles having a negative electrostatic charge thereon at the pH of the solution. The mixture is then stirred, preferably including an ultrasonic treatment, and the negatively charged colloidal particles are attracted to and irreversibly bonded to the positively charged magnetic particles. An excess of colloidal particles is preferably added to the mixture so that as aggregated magnetic particles are separated by the ultrasonic treatment, sufficient free colloidal particles are available in the mixture to coat the freed magnetic particles before they can again aggregate.

The result is that the magnetic particles are uniformly and thoroughly coated with colloidal particles to insure a minimum separation between adjacent magnetic particles, this minimum separation being two diameters of the colloidal particles. After the magnetic particles are coated, the pH of the dispersion preferably is increased so that the colloidal particles can acquire an even higher negative charge and the dispersion is rendered more stable. At this higher pH, the coated particles are kept apart not only by electrostatic repulsion but also by the physical existence and location of the colloidal particles which are bonded to the magnetic particles and whose presence reduces the magnetic attraction between coated particles. After the preparation, the dispersion may be applied to a suitable substrate to form a magnetic coating having magnetic particles therein which are separated from each other.

DESCRIPTION OF THE BEST MODE AND INDUSTRIAL APPLICABILITY

In accordance with the present invention, a suitable dry magnetic particle material, such as gamma $Fe_2O_3$, is mixed with a suitable acid, such as hydrochloric acid, and the resulting mixture is stirred for a period of time. This mixing facilitates separation of the magnetic particles by dissolving bridges therebetween, and also narrows the particle size distribution range in the resulting dispersion by dissolution of the smaller size magnetic particles.

Figure 1:
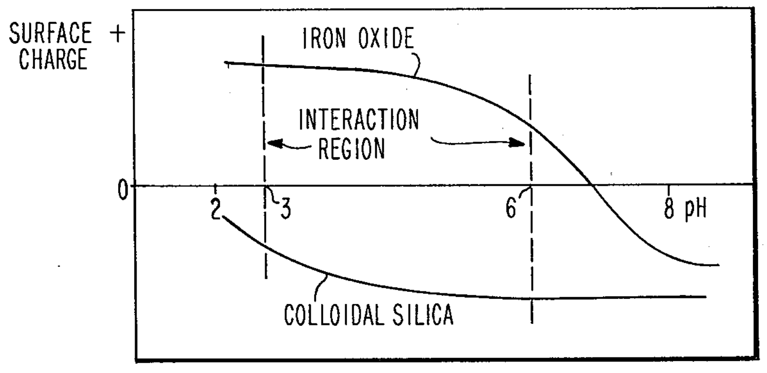
FIG. 1 is a graph illustrating the use of controlled pH values to produce electrostatic attraction between the magnetic particles and the colloidal particles.

After this mixing, the pH of the magnetic particle mixture is adjusted to a suitable value to produce a positive electrostatic charge on the magnetic particles. As shown by the graph of FIG. 1, iron oxide particles exhibit a significant positive electrostatic charge in the pH region between 3 and 6, and the pH of the slurry containing the magnetic particles is adjusted to a value within this range. Colloidal particles, preferably silica, are prepared in a slurry and the pH of this slurry is adjusted to a value which will produce a negative electrostatic charge on the silica particles. As shown in the graph of FIG. 1, colloidal silica particles exhibit a significant negative electrostatic charge in the pH range from 3 to 6, and a value within this range is selected for matching with the pH of the slurry containing the magnetic particles.

The colloidal silica particles are added to the slurry containing the iron oxide particles and the mixture is stirred, preferably in the presence of ultrasonic treatment, to facilitate reaction. The colloidal silica particles, with their negative electrostatic charge, are attracted to the positively charged iron oxide particles. An excess of colloidal silica is preferably added to the mixture so that as aggregated iron oxide particles are separated by the mixing and ultrasonic treatment, sufficient silica particles are available to quickly coat the separated magnetic particles before they can become attracted again to other magnetic particles.

Figure 2:
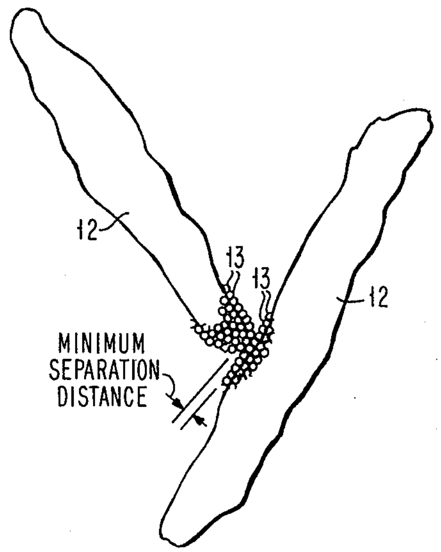
FIG. 2 is a representation of two magnetic particles coated with and separated by colloidal silica particles.

After coating, the magnetic particles with the absorbed monolayers of protective colloids irreversibly bonded thereto are spaced far enough apart from each other so that their mutual magnetic attraction and tendency to aggregate are significantly reduced. As shown in FIG. 2, which illustrates iron oxide particles 12 coated with colloidal particles 13, the minimum separation between adjacent magnetic particles 12 is equal to two diameters of the absorbed silica particles 13.

The bond between the magnetic particles and the silica particles becomes irreversible by virtue of the chemical reaction occurring. The hydroxyl groups forming part of both the magnetic particles and silica particles react with each other, driving off water and leaving a covalent oxygen bond to bond the particles together. Thus, even though the mixture may be subsequently raised to a pH around 9.5, where both the magnetic particles and silica particles have negative electrostatic charges, the described chemical bond firmly holds the silica particles to the magnetic particles.

After the magnetic particles are coated with colloidal silica as described, the pH of the resulting mixture is preferably increased to the neighborhood of 9.5 so that the silica particles can acquire a higher negative electrostatic charge. At this pH, the particles are kept apart not only by the electrostatic repulsion but also by the physical spacing provided by the silica particles which lowers the magnetic attraction between magnetic particles.

The minimum separation distance between magnetic particles can be conveniently altered by using protective colloids of various particle size. Materials such as mono-dispersed colloidal silica sold by DuPont under the trademark "Ludox", are available in a wide range of particle sizes (70 to 220 Å). Thus, in applications requiring dense coatings of magnetic particles or in dispersions of small metal or oxide particles, a small size of the protective colloid, i.e. Ludox SM, 70 Å particle size, would be used. For coatings composed of large or well spaced and non-interacting particles, a larger size (220 Å) protective colloid could be utilized.

Furthermore, although the above embodiment discusses a water-based dispersion, the colloidal silica coated magnetic particles can be employed in a conventional non-aqueous medium, provided that water is replaced by an organic system using one of the known solvent exchange techniques.

EXAMPLES

EXAMPLE 1

5 gms of gamma iron oxide powder were mixed with 50 ml of 5% weight/weight HCl and subjected to ultrasonic treatment at 400 watts for 3 minutes. Additional acid (12 ml of concentrated HCl) was added and the slurry was stirred for 40 minutes. Subsequently, the iron oxide particles were washed with water until a pH of 3.5 was reached.

5 gms of colloidal silica (30% weight/weight, Ludox HS, 120 Å) were mixed with a cationic ion exchange resin (Amberlite IR-120) and stirred until a pH of 3.5 was also reached. Alternatively, this pH alteration could be achieved by the addition of diluted sulfuric or hydrochloric acid. The ion exchange resin was removed by filtration and the colloidal silica was added to the iron oxide slurry. The mixture was then subjected to ultrasonic treatment (400 watts) for 10 minutes. An excess of silica and other non-magnetic debris were then removed by magnetic sedimentation. The pH of the mixture was then increased to the neighborhood of 9.5, first by the addition of water and successive decanting operations and then by the addition of a suitable base such as sodium hydroxide.

EXAMPLE 2

Same method as described in Example 1, except using $Co/Fe_2O_3$ (cobalt doped gamma iron oxide) instead of gamma iron oxide.

EXAMPLE 3

Same method as described in Example 1, except using $Co/Fe_3O_4$ (cobalt doped ferrite) instead of iron oxide.

The quality of magnetic dispersions was evaluated using the Coulter Counter Instrument. Size distribution graphs show a decrease in the average diameter from 2 microns in dispersions prepared by conventional ball-milling and an amorphous silica coating treatment, to 0.6 micron for magnetic dispersions coated with colloidal silica in accordance with the present invention. In addition, examination by scanning electron microscopy revealed the presence of a compact monolayer of silica spheres encapsulating individual iron oxide particles.

After preparation of the magnetic mixture in the above manner, it may be employed as a magnetic recording material by application to a suitable substrate. The mixture may be applied to a disk substrate, for example, to form a magnetic recording surface with the magnetic particles therein uniformly dispersed.

The following examples illustrate the transfer of silica coated iron oxide particles from a water-based dispersion into an organic phase.

EXAMPLE 4

In this example, a dispersion containing 5 grams of iron oxide particles was allowed to settle on a small permanent magnet. Particle-free water was decanted and the concentrated magnetic slurry was mixed with 100 milliliters of acetone. After thorough mixing, the acetone was decanted and the acetone washing step was repeated. Following the settling of the particles in the magnetic field, the acetone-based slurry was compatible with organic solvents such as cyclohexanone or isophorone.

EXAMPLE 5

In this example a dispersion containing 5 grams of iron oxide particles was concentrated by means of a small permanent magnet. One hundred milliliters of isophorone containing 2 percent oleic acid were added to the decanted magnetic slurry and the mixture was heated to 110° C. with continuous stirring. After the water evaporated (30 minutes), the temperature was allowed to rise to 130° C. for an additional 10 minutes. The dispersion of iron oxide particles in isophorone was concentrated by placing the fluid near the poles of a permanent magnet.

We claim:

1. A method of manufacturing a magnetic dispersion containing magnetic particles, comprising the steps of:

leaching the dry magnetic particles in an acid to form a slurry;

adjusting the pH of the said slurry to between 3 and 6 to produce a positive electrostatic charge on said magnetic particles;

adding to said slurry a dispersion of colloidal particles having a pH between 3 and 6, the colloidal particles having a negative electrostatic charge thereon; and mixing said slurry with said dispersion, the opposite charges on said particles causing the colloidal particles to be attracted to and irreversibly bond to the magnetic particles.

2. A method in accordance with claim 1, in which said colloidal particles are colloidal silica particles.

3. A method in accordance with claim 1, in which said colloidal particles have a uniform size distribution and size relation to said magnetic particles.

4. A method in accordance with claim 1, in which the pH of said slurry and of said colloidal dispersion is between 3.0 and 3.7.

5. A method in accordance with claim 1, including the step of raising the pH of said resulting mixture to approximately 9.5 to increase the electrostatic repulsion forces between said silica particles.

6. A method in accordance with claim 5, in which said colloidal particles have a uniform size distribution and size relationship to said magnetic particles.

7. A method in accordance with claim 1, including the step of removing water from the mixture by solvent exchange to produce a non-aqueous mixture.

* * * * *